United States Patent [19]

Edmonds et al.

[11] Patent Number: 5,022,028
[45] Date of Patent: Jun. 4, 1991

[54] SOFTWARE VERIFICATION APPARATUS

[75] Inventors: Edward J. Edmonds, Brooklands; John G. Curran, Stoneyhurst, both of Ireland

[73] Assignee: Elverex Limited, Limerick, Ireland

[21] Appl. No.: 330,430

[22] Filed: Mar. 30, 1989

[30] Foreign Application Priority Data

Mar. 30, 1988 [IE] Ireland .................................. 956/88

[51] Int. Cl.$^5$ ............................................. G06F 11/00
[52] U.S. Cl. ................................... 371/25.1; 371/25.1
[58] Field of Search ..................... 371/19, 16.1, 18, 23, 371/24, 25.1, 67.1, 71, 15.1

[56] References Cited

U.S. PATENT DOCUMENTS 4,696,003  9/1987  Kerr ....................................... 371/19
4,899,306  2/1990  Greer ............................. 371/16.1 X

FOREIGN PATENT DOCUMENTS 2096371 10/1981 United Kingdom .

Primary Examiner—Jerry Smith
Assistant Examiner—Robert W. Beausoliel
Attorney, Agent, or Firm—Fleit, Jacobson, Cohn, Price, Holman & Stern

[57] ABSTRACT

An apparatus for verification of target software loaded in a target computer. The apparatus includes communication and monitoring circuits inserted in the target computer and in a host computer which is programmed to direct operation of target software tests through the communication and monitoring circuits. The communication and monitoring circuits transmit external stimuli to the target software in a non-intrusive manner by, for example, keyboard simulation. The communication and monitoring circuits also capture target software output data for comparison with reference data stored in the host computer. Both of these operations are carried out in a non-intrusive manner in hardware, (the communication and monitoring circuits). The external stimuli including test instructions may be either recorded in a manual recording session or may be generated in the host computer. Similarly, the target software output reference data may be either generated in the host computer or recorded in a manual session. The apparatus is particularly suitable for regression testing and enables a user to detect faults at any stage of software development irrespective of how many updates are involved.

9 Claims, 6 Drawing Sheets

SOFTWARE VERIFICATION APPARATUS

BACKGROUND OF THE INVENTION

1. Introduction

The present invention relates to an apparatus to assist in the verification of software in a computer system.

2. Field of the Invention

It has long been appreciated that the most important objective when developing software is that of ensuring that the software is free of faults when released on the market. Studies have shown that the costs involved in eliminating software faults during initial development and testing is of the order of 0.1% of the cost of eliminating faults when software is in use by a purchaser.

Heretofore, the most common approach to eliminating faults in software during development has been to manually input test instructions and to monitor the corresponding output. This approach has been used because the complexity of much software does not lend itself to the automatic generation of test instructions and the manual approach allows a large degree of versatility. The major disadvantages of manual verification are that it is extremely time-consuming, especially for regression testing where there are revision up-dates in the software, as is often the case. Indeed, it is envisaged that if each revision up-date is to be tested satisfactorily, many man-days of skilled time are required. A further disadvantage of manual verification is that it is generally error prone as it is necessary for a person to visually monitor output over a long period of time.

In the past, some attempts at automating software verification have been directed towards specific aspects of software verification. For example, United Kingdom Patent Specification No. 2,096,371 A describes an apparatus for assisting in fault-finding in a data processing system. This apparatus appears to be useful in the testing of software loaded in a specific microprocessor and indeed, it has been designed with microprocessor time frames in mind. This prior apparatus is, however, not suitable for use with software loaded in other than a microprocessor and does not appear to have the required flexibility for regression testing.

Other attempts at automating software verification are software based and have the capability to simulate target software inputs and capture corresponding outputs. The testing software is generally run alongside the target software in the target computer. Accordingly, the target software is not tested in a similar environment to that in which it would normally be used. A further disadvantage of such testing systems is that they are usually only suitable for one type of target software language and operating system generally, and are thus not versatile.

OBJECTS OF THE INVENTION

The present invention is directed towards providing a software verification apparatus which allows a user to automatically carry out tests on software.

It is a further object of the invention to allow the user complete versatility in the type of tests carried out and the manner in which test instructions are generated.

Another object of the invention is to allow automatic testing in a non-intrusive manner so that target software is tested in it's operating environment.

A still further object is to provide a software verification apparatus which may be used to test many different types of target software.

SUMMARY OF THE INVENTION

According to the invention an apparatus for nonintrusively verifying target software loaded in a target computer comprising:

an input transmission circuit for transmission of external stimuli to the target software;

a recording circuit for recordal of external stimuli transmitted to target software and for recordal of corresponding output data;

programming means for generating external stimuli for the target software and for generating a set of expected corresponding target software output data;

storage means for storage of generated and recorded target software external stimuli as reference external stimuli and for storage of target software generated and recorded output data as a set of reference output data; and control means having means for directing the transmission of stored reference external stimuli to the target software, means for directing recordal of corresponding target software output data, and for comparing the recorded output data with the stored reference output data to provide a verification user output.

ADVANTAGES OF THE INVENTION

It will be appreciated that because the invention provides recording and input transmission circuits in hardware, non-intrusive verification is possible.

The apparatus is extremely versatile as it may use generated or recorded inputs and outputs. It has been found that it is very convenient to generate inputs and outputs when repetitive mathamatical calculations are involved.

The invention will be more clearly understood from the following description of a preferred embodiment thereof given by way of example only with reference to the accompanying drawings.

DETAILED DESCRIPTION OF THE INVENTION

Figure 1:
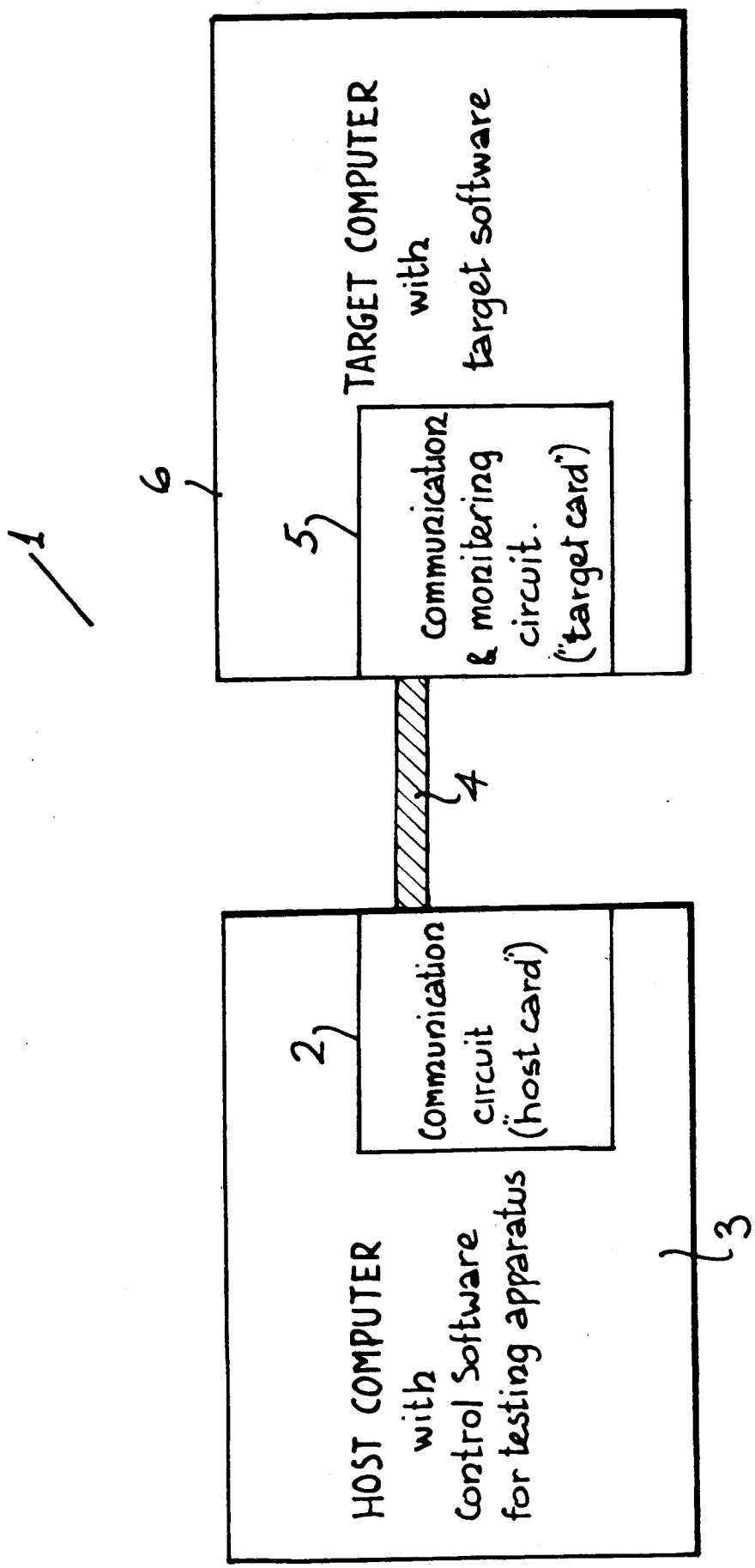
FIG. 1 is an overall block diagram illustrating a software verification apparatus according to the invention.

Referring to the drawings, and initially to FIG. 1 there is illustrated a software verification apparatus indicated generally by the reference numeral 1. The software verification apparatus 1 comprises hardware based communication and monitoring circuits arranged to simulate user tasks. Control software for the apparatus is located separately from the target software being tested.

The apparatus 1 comprises a communication circuit 2 arranged to be inserted in a host computer such as that indicated generally by the reference numeral 3. The communication circuit 2 is thus hereinafter referred to as a "host card". The apparatus 1 also comprises a high speed communication bus cable 4 connecting the host card 2 to a target communication and monitoring circuit 5 arranged to be inserted in a target computer 6 in which is loaded target software. The communication and monitoring circuit 5 is hereinafter referred to as a "target card". The host computer 3 will generally be a micro-computer, however, the target computer 6 may be any type of computer ranging in size from a micro-computer to a main-frame. In most situations, however, the target computer 6 will be a micro-computer, which in some cases may be connected by a PC link to a main-frame computer, if required.

Figure 2:
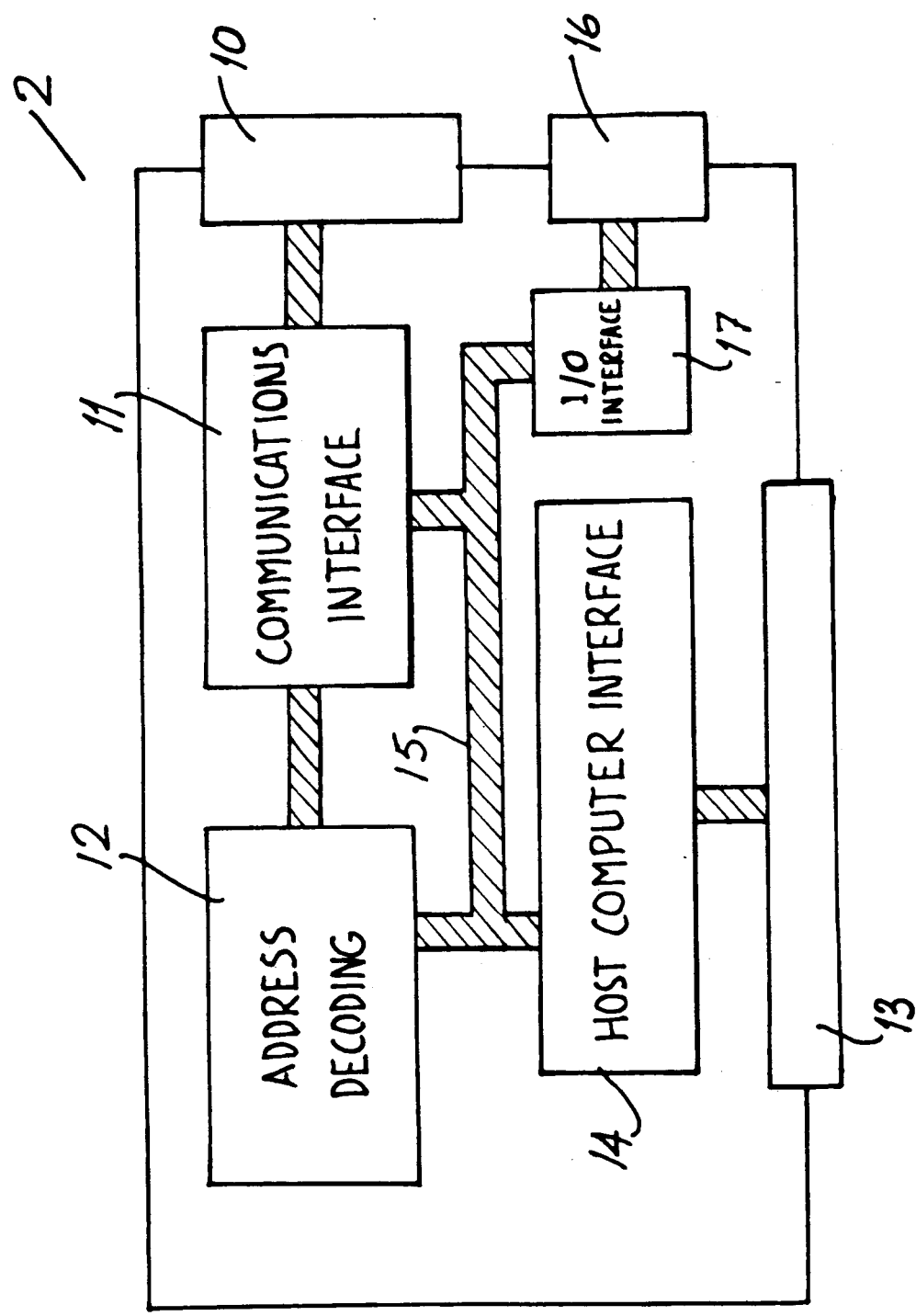
FIG. 2 is a block diagram illustrating portion of the apparatus in more detail.

Referring now to FIG. 2, the host card 2 is illustrated in more detail. The host card 2 comprises a communication bus connector 10 for connection with the bus cable 4. The bus connector 10 is connected to a communications interface circuit 11, which is in turn connected to an address decoding circuit 12. The host card 2 also comprises a host computer connector 13, which is connected to a host computer interface 14. A host card bus 15 interconnects the various portions of the host card 2. The host card 2 further comprises a digital input/output connector 16 connected to an input/output interface 17.

It will be seen, therefore, that the host card 2 is essentially a high speed communication circuit which is capable of transmitting or receiving data to or from the target computer 6. The digital input/output connector 16 and its associated interface 17 provide for four digital inputs and outputs which facilitate external control of the apparatus other than through the host computer 3.

Figure 3A:
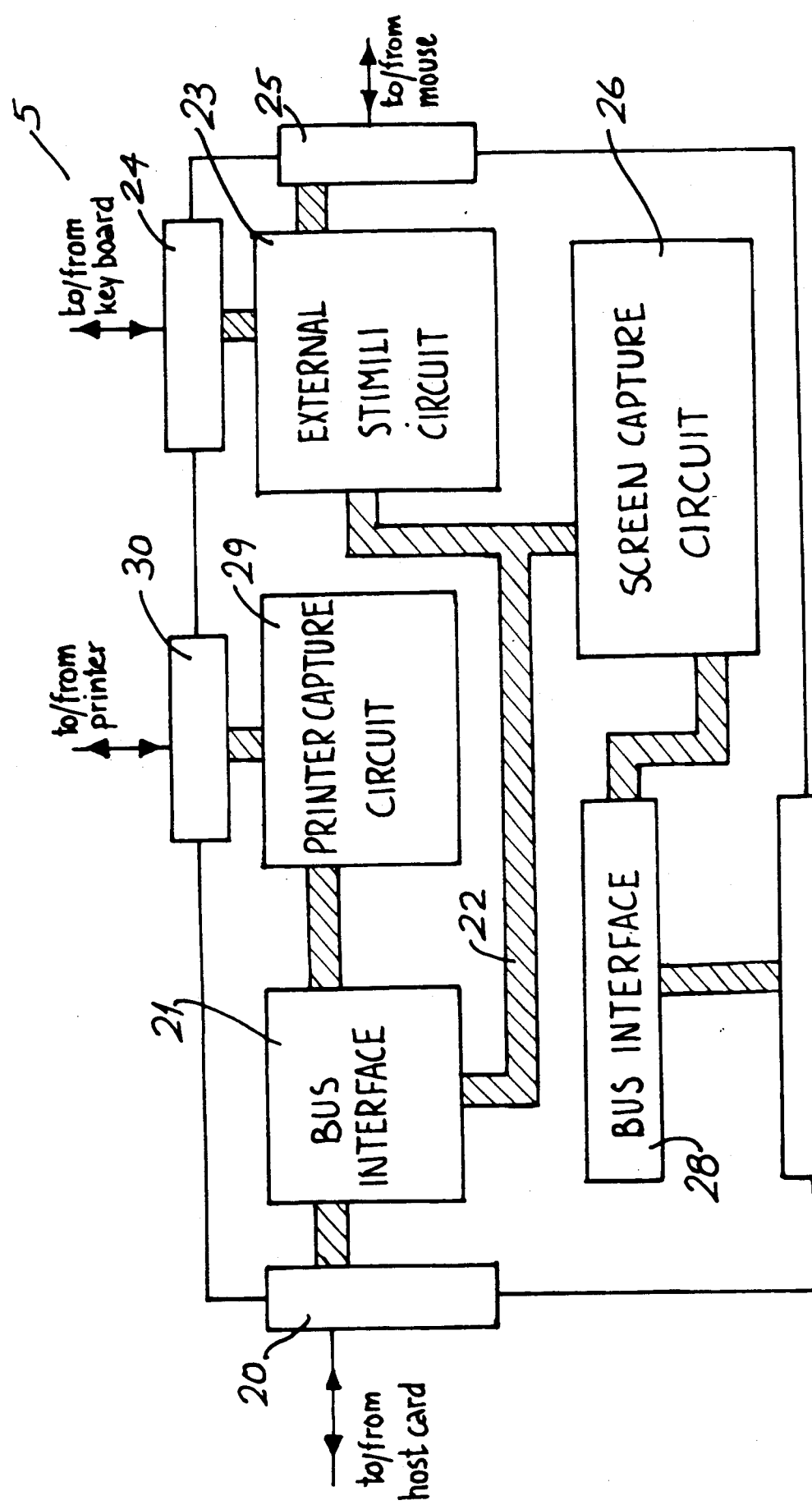
FIGS. 3(a) to 3(c) are block diagrams illustrating further portion of the apparatus in more detail.
Figure 3B:
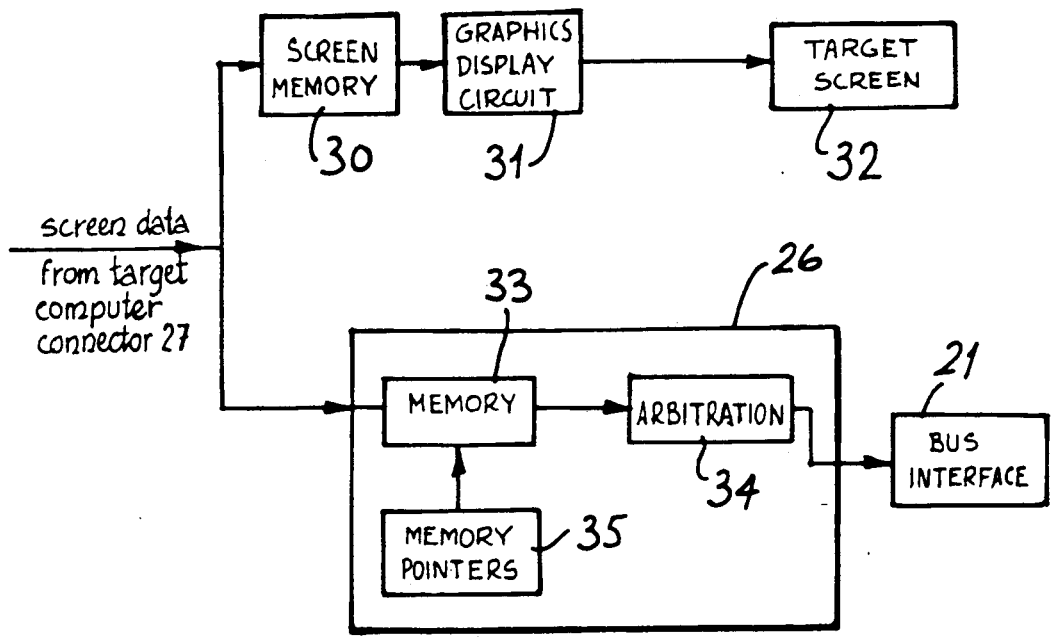
Figure 3C:
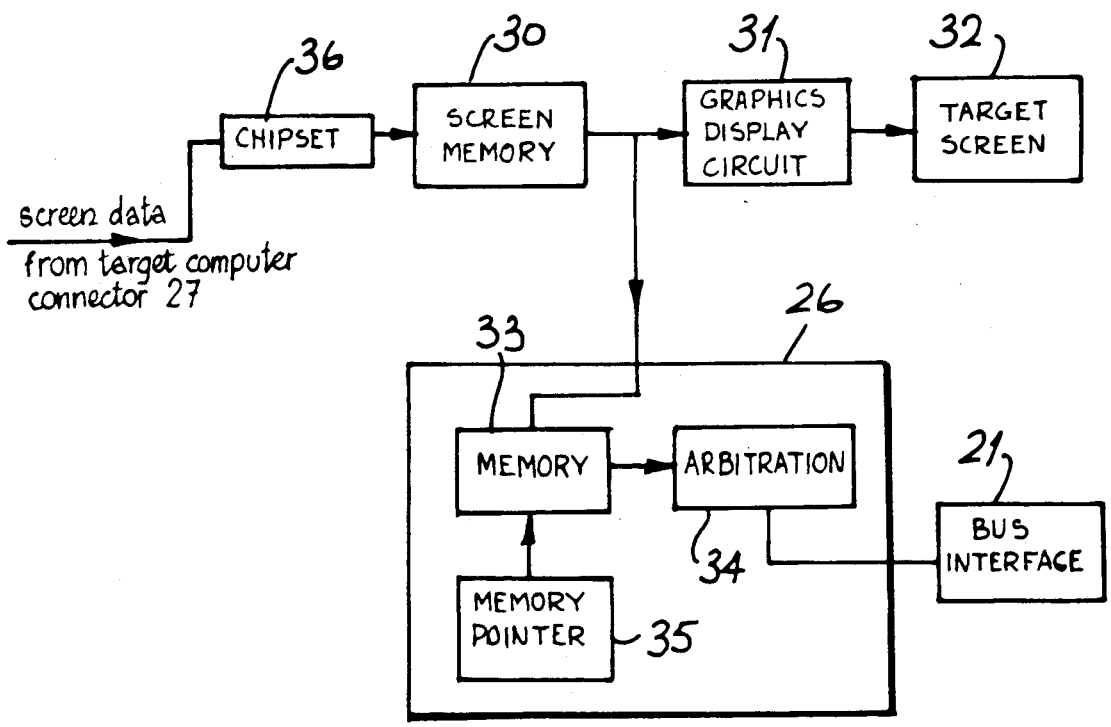

Referring now to FIGS. 3(a) to 3(c), the target card 5 is illustrated in more detail, and parts similar to those described with reference to the previous drawings are identified by the same reference numerals. The target card 5 includes a bus connector 20 connected to a bus interface 21. The bus interface 21 is connected by a target card bus 22 to an external stimuli circuit 23. The external stimuli circuit 23 is arranged to capture keyboard and mouse external stimuli and to re-transmit these stimuli when required. The external stimuli circuit 23 is thus connected to a keyboard connector 24 and to a mouse connector 25. The target bus 22 also connects with a screen capture circuit 26 which is arranged to receive target software screen output data from a target computer bus connector 27 and associated interface 28. The target card 5 also includes a printer capture circuit 29 for connection with a printer by a printer connector 30.

The target card 5 is configured to be inserted in a slot in the target computer 6.

Referring specifically to FIGS. 3(b) and 3(c), the screen capture circuit 26 and it's operation are illustrated in more detail. Target computer screen data is written either directly or via a chipset to a screen memory circuit 30. The screen memory circuit 30 is accessed by a graphic display circuit 31 which processes the data for display on a screen 32. The screen capture circuit 26 includes memory chips 33. An arbitration circuit 34 controls access of the bus interface 31 (and thereby the host computer) to the memory chips 33. A memory pointer circuit 35 allows access of the bus interface 31 to specified screen windows.

In FIG. 3(b) the situation where the target computer writes directly to the screen memory 30 is illustrated. In this case, the memory chips 33 occupy the same memory locations as the screen memory 30 and the screen data is simultaneously written in parallel to both the screen memory 30 and to the memory chips 33. In essence, therefore, the screen capture circuit 26 may be regarded as acting as a screen memory mirror which may be accessed by the host computer, as the graphics display circuit accesses the screen memory.

In FIG. 3(c), the situation is illustrated whereby the screen memory 30 is written to via a chipset 36. In this case, memory chips 33 are written to by reading from the screen memory 33 as this is being done by the graphics display circuit 31.

It will be appreciated that in both cases target software output data is captured in a simple inexpensive and most importantly, in a non-intrusive manner.

The operation of the software verification apparatus 1 is described in detail below with reference to FIGS. 4(a) to 4(d). Briefly, the operation is as follows. The host card 2 is inserted in a slot in the host computer 3 and the target card 5 is inserted in a slot in the target computer 6. The host card 2 and the target card 5 are interconnected by the bus cable 4. The software which is to be verified is loaded in the target computer 6 and control software for the apparatus is loaded in the host computer 3.

There are three modes of operation of the software verification apparatus 1, namely, a record mode, a playback mode, and a programming mode. In the record mode the apparatus monitors and records manually inputted test instructions to the target software. The apparatus in this mode also captures screen and printer data outputted from the target software as reference data. In the playback mode, these instructions are re-transmitted to the target software in a non-intrusive manner so that the software "sees" a manually inputted instruction. The target software output data during playback is compared with the reference output which has been recorded. In the programming mode, the apparatus 1 generates test instructions without the need to record manual instructions. Generally speaking, these types of instructions are generated by a numerical algorithm such as that for a spreadsheet including grids containing numerical information. The apparatus 1 will be capable of inputting these instructions to the target software and monitoring the output and comparing it with a generated reference output. In this latter case, instructions may also be inputted manually.

Figure 4B:
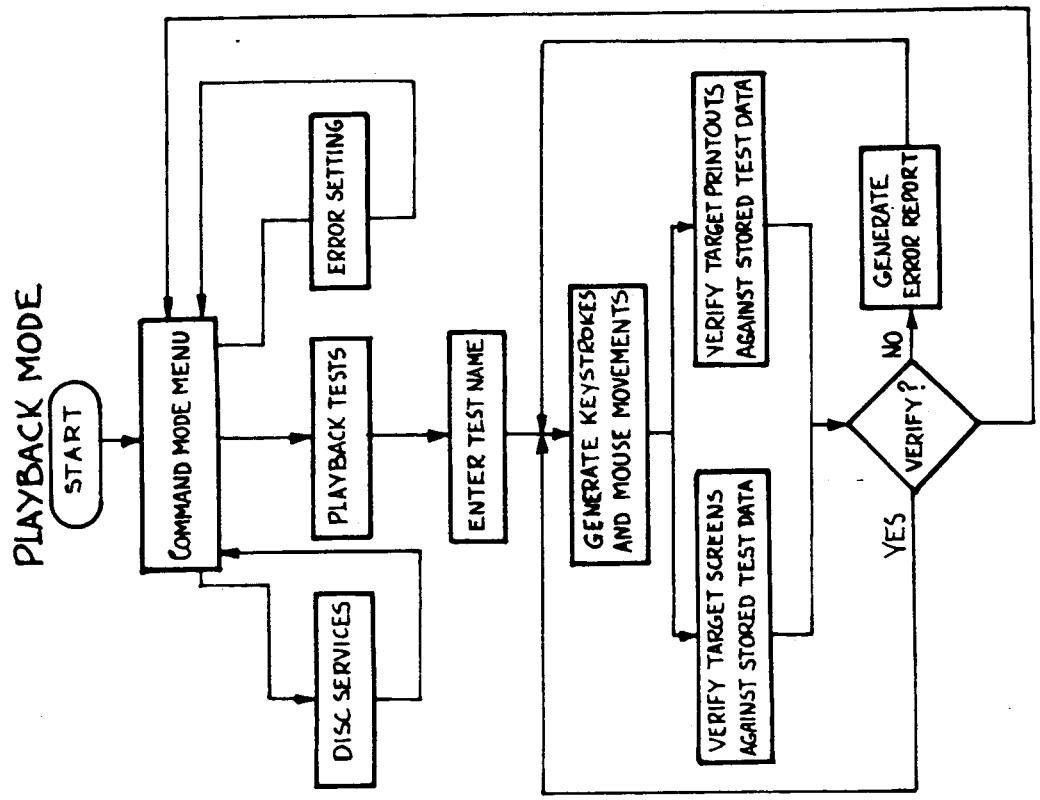
FIGS. 4(a) to 4(d) are flow diagrams illustrating operation of the apparatus, in use.
Figure 4A:
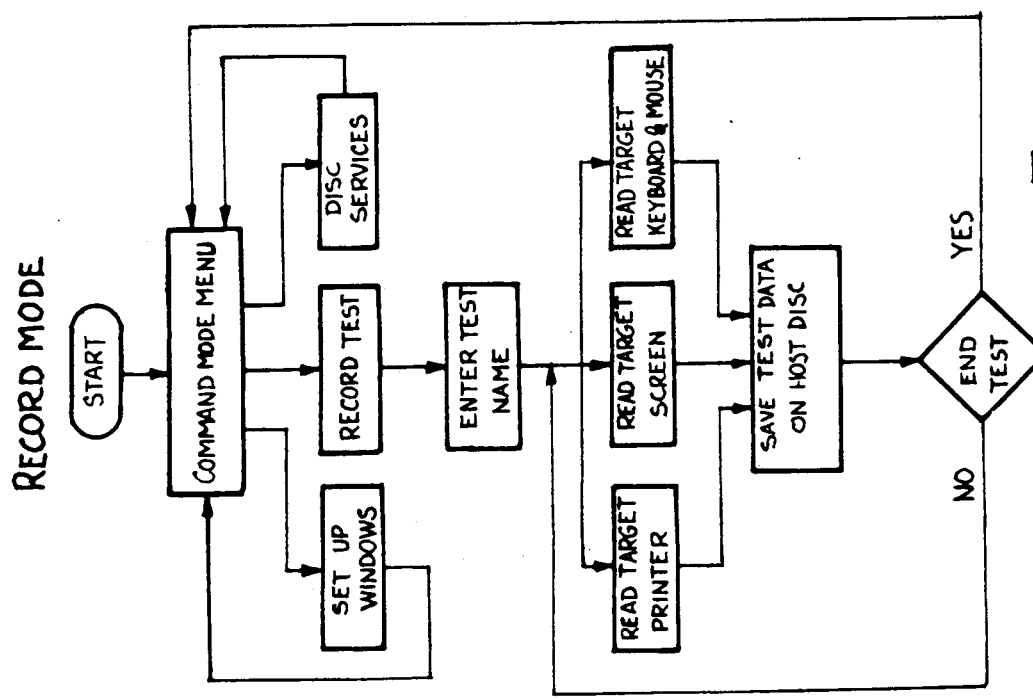

Referring now to FIG. 4(a), operation of the apparatus 1 in the record mode is illustrated. A user will initially set up windows and disc services (such as directories) before indicating that a test is to be recorded. After entering a test name, the user will input test instructions and read the target computer screen and printer outputs. When a user is satisfied that the target software output is correct, the test output is saved on disc in the host computer 3. To do this, the external stimuli circuit 23 and the screen circuit 26 of the target card 5 monitor inputs and outputs and these are transmitted via the bus cable 4 and the host card 2 to the host computer 3 where they are stored. At the end of this procedure the host computer has recorded every keystroke and selected screens and a user is given the opportunity of replaying the test to check if any deviations from the original have occurred.

It is envisaged that a series of tests may be stored on the host computer 3 and thereafter, to perform a full regression test, it is only necessary to run this series of tests again. The verification software loaded in the host computer 3 allows the key-strokes and commands and target software outputs to be stored in a readable format which can be modified using a standard editor. As the test is being recorded, comments may be added to help clarify each step. These comments may be displayed later. To further help in later tests, identification information can also be used. In recording a test, windows on the screen which are to be monitored more closely may be defined.

Referring now to FIG. 4(b), operation of the apparatus 1 in the playback mode is illustrated in more detail. In this mode tests developed during the record mode are executed, i.e. each key stroke of the recording session is reproduced and the target screens are compared against the reference screens stored on the host computer 3. Target print-outs are verified in a similar manner. After entering the menu, the user may select disc services and error settings. This latter step is important as it may change depending on the type of software in the target computer. After opting for the playback mode, a user enters the test name and the apparatus 1 thereafter transmits recorded test instructions as external stimuli from the host computer 3 to the target software. As a separate hardware based external stimuli is used, this is done non-intrusively, and the target software only "sees" manual keystrokes or mouse inputs. The apparatus 1 then compares the target screens with the stored reference target screens in the host computer and outputs a verification decision. If there are errors, an error report is either displayed on the host computer or printed. This procedure is repeatedly carried out for each screen.

It is envisaged that because of the time involved in inputting tests and monitoring outputs, the apparatus 1 will be left to operate unattended. Tests may be run as a batch file or may be chained together in unattended operation. It is also envisaged that the same test suite may be cycled repeatedly for exhaustive testing of the target software. For unattended operation, the error reports may be logged to disc in the host computer 3 for later inspection, or they may be printed out immediately.

Figure 4:
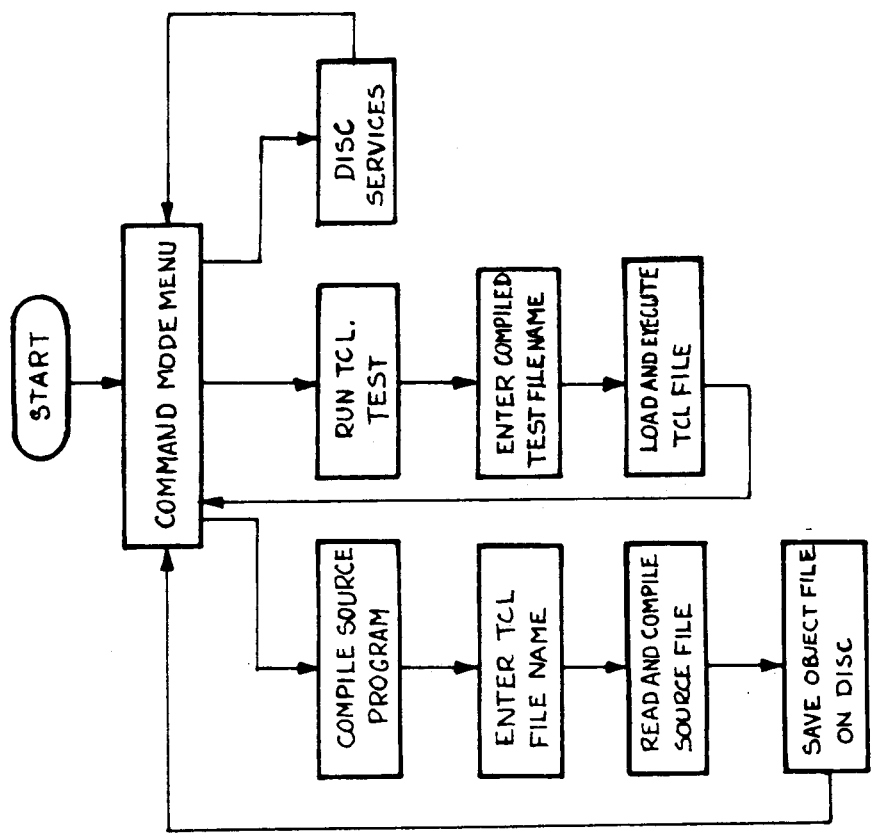
Figure 4:
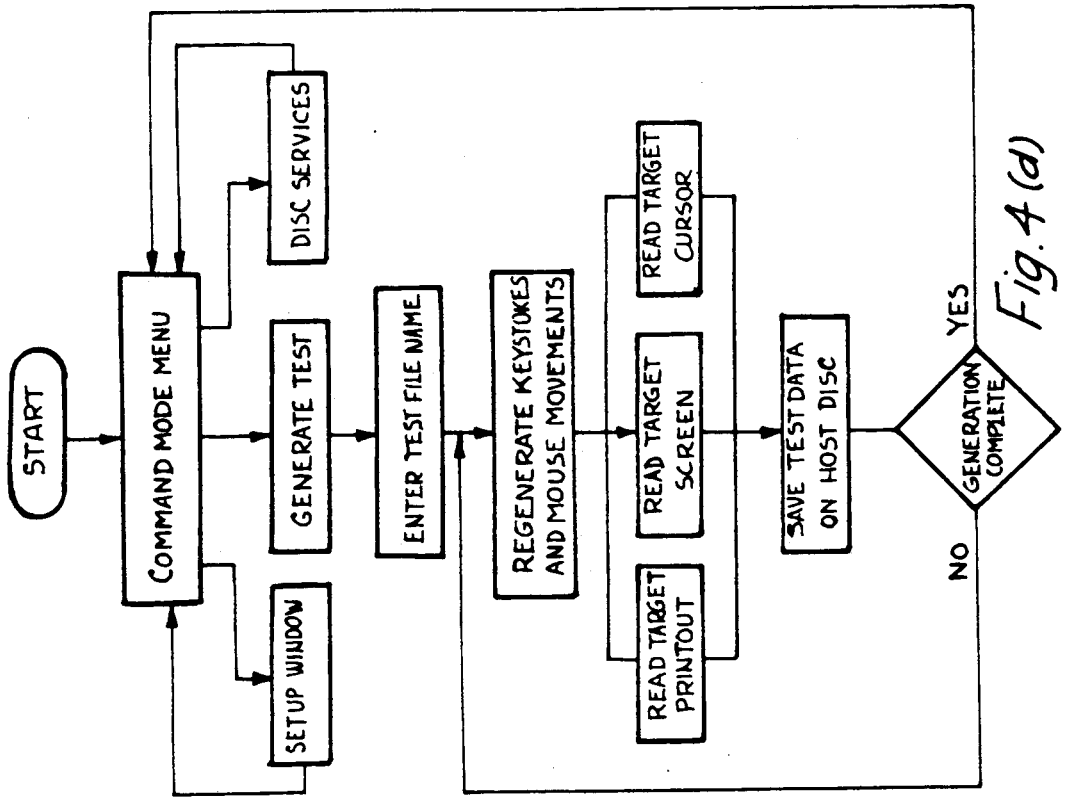

Referring to FIG. 4 (c) development of a programme for generation of test instructions in the programming mode is illustrated. A source programme is written in Test Control Language (TCL) and compiled and saved on disc. This may then be used to run TCL tests by generating test instructions which are transmitted to the target software. The source programme also generates expected target software output data to form a set of reference data.

It is envisaged that in the programming mode, a library of test routines can be developed and used as building blocks for efficient test development. TCL can run an entire suite of software tests under programme control and generate a report on the overall performance of the target software.

Referring now to FIG. 4 (d) operation of the apparatus 1 is illustrated for regression testing. This may be regarded as a fourth, generate, mode of operation. This mode is used if target software is changed after a manual recording session. After display of the mode menu, a user sets up windows which are to be monitored and stipulates disc services. A test file name is entered and the apparatus re-transmits key strokes and mouse movements which had been recorded previously. At the same time, the apparatus reads the target screen, printer, output and cursor movement and saves this information on disc in the host computer 3, as new reference data. In this way, a user is saved the time involved in recording another testing session after any modification of the target software.

In the above description, selection of disc services includes, for example, changing a directory or loading-/saving files.

It is envisaged that random test data instead of comprehensive test data may be generated in the programming mode. It will also be appreciated that because the apparatus provides what is essentially a communications capture, transmission and reception device which is separate from the target software, the apparatus may non-intrusively test target software in a relatively simple and convenient manner. Further, it is thus not dependent on the type of target software being tested. Various features which help a user generate and run tests may be programmed in the host computer software without making any changes to the hardware cards inserted in the two computers. This arrangement leads to an extremely versatile and simple method of generating and running tests.

It will be appreciated that the apparatus saves a huge amount of time in verifying software and is generally error-free. The host computer software may be modified to provide for various formats and methods of inputting information which may be convenient. The important point is that the host and target cards provide a communication and monitoring circuit to implement the various tests in a simple and non-intrusive manner.

Needless to say, the invention is not limited to the embodiment hereinbefore described but may be varied in construction and detail.

What is claimed is:

1. An apparatus for non-intrusively verifying target software loaded in a target computer comprising:
   an input transmission circuit for transmission of external stimuli to the target software;
   a recording circuit for recordal of external stimuli transmitted to the target software and for recordal of corresponding output data from the target software;
   programming means for generating external stimuli for the target software and for generating a set of expected corresponding target software output data;
   storage means for storage of generated and recorded target software external stimuli as reference external stimuli and for storage of target software generated and recorded output data as a set of reference output data; and
   control means having means for directing transmission of the stored reference external stimuli to the target software, means for controlling recording of the corresponding target software output data, and means for comparing the recorded output data with the stored reference output data to provide a verification user output.

2. A software verification apparatus as claimed in claim 1 in which the input transmission circuit is adapted to simulate operation of input circuits of the target computer for non-intrusive transmission of external stimuli to the target software.

3. A software verification apparatus as claimed in claim 1 in which the recording circuit includes a capture circuit having a memory circuit for non-intrusive monitoring of target software output data written to screen memory circuits of the target computer or read from the screen memory circuits.

4. A software verification apparatus as claimed in claim 3, in which the memory circuit has the same memory addresses as the screen memory so that, in use, target software output data is written simultaneously to the memory circuit and to the screen memory.

5. A software verification apparatus as claimed in claim 3 in which the memory circuit is arranged to receive target software output data transmitted to a graphics display circuit of the target computer simultaneously with the graphics display circuit.

6. A software verification apparatus as claimed in claim 1 in which the recording circuit comprises means for recordal of keyboard input signals for the target software.

7. A software verification apparatus as claimed in claim 1 in which the programming means comprises means for generating test instructions for the target software based on mathematical algorithms.

8. A software verification apparatus as claimed in claim 1 in which the programming means, storage means and the control means form part of host computing means connected to the target computer via the input transmission circuit and recording circuit.

9. A software verification apparatus as claimed in claim 8 in which the host computing means comprises a host computer and the input transmission circuit and the recording circuit are for mechanical insertion in the host and target computers to interconnect the host and target computers.

* * * * *